(12) United States Patent
Humer et al.

(10) Patent No.: US 7,677,659 B2
(45) Date of Patent: Mar. 16, 2010

(54) ACTIVE HEAD RESTRAINT SYSTEMS FOR VEHICLE SEATS

(75) Inventors: Mladen Humer, West Bloomfield, MI (US); Sai Prasad Jammalamadaka, Novi, MI (US); Gerald S. Locke, Lake Orion, MI (US); Michael Przybylski, Grand Blanc, MI (US); Alex Van Duyne, Plymouth, MI (US); Eric Veine, Wixom, MI (US); Arjun V. Yetukuri, Rochester Hills, MI (US)

(73) Assignee: Lear Corporation, Southfield, MI (US)

( * ) Notice: Subject to any disclaimer, the term of this patent is extended or adjusted under 35 U.S.C. 154(b) by 90 days.

(21) Appl. No.: 11/671,799

(22) Filed: Feb. 6, 2007

(65) Prior Publication Data

US 2008/0185882 A1 Aug. 7, 2008

(51) Int. Cl.
*B60N 2/427* (2006.01)

(52) U.S. Cl. .............. 297/216.14; 297/216.1; 297/216.12; 297/216.13

(58) Field of Classification Search .......... 297/216.1, 297/216.12, 216.13, 216.14
See application file for complete search history.

(56) References Cited

U.S. PATENT DOCUMENTS

| | | | |
|---|---|---|---|
| 4,222,608 A | 9/1980 | Maeda | |
| 5,397,164 A | 3/1995 | Schuster et al. | |
| 5,518,294 A | 5/1996 | Ligon, Sr. et al. | |
| 5,884,968 A | 3/1999 | Massara | |
| 5,927,804 A | 7/1999 | Cuevas | |
| 6,019,424 A | 2/2000 | Ruckert et al. | |
| 6,024,406 A * | 2/2000 | Charras et al. | 297/216.14 |
| 6,199,947 B1 | 3/2001 | Wiklund | |
| 6,250,714 B1 | 6/2001 | Nakano et al. | |
| 6,312,050 B1 | 11/2001 | Eklind | |
| 6,375,262 B1 | 4/2002 | Watanabe | |
| 6,398,299 B1 | 6/2002 | Angerer et al. | |
| 6,416,125 B1 | 7/2002 | Shah et al. | |

(Continued)

FOREIGN PATENT DOCUMENTS

CN 1898105 A 1/2007

(Continued)

OTHER PUBLICATIONS

German Office Action for corresponding Application No. DE 10 2008 003 183.6, mailed Nov. 11, 2008, 3 pages.

(Continued)

*Primary Examiner*—David Dunn
*Assistant Examiner*—Patrick Lynch
(74) *Attorney, Agent, or Firm*—Brooks Kushman P.C.

(57) ABSTRACT

Multiple vehicle seats are disclosed with active head restraint systems that receive an input force from an occupant during an impact by a torso support, which consequently actuates a linkage that translates a head restraint upward and forward to the head of the occupant. In one embodiment, the torso support has a translatable connection with the seatback frame and another translatable connection with the linkage. In another embodiment, a torso support is pivotally connected to a pair of links which are each pivotally connected to the frame. In yet another embodiment, the seatback frame includes a structural wire, which provides pivotal connections for two of the links of the linkage.

20 Claims, 6 Drawing Sheets

U.S. PATENT DOCUMENTS

| | | |
|---|---|---|
| 6,523,892 B1 | 2/2003 | Kage et al. |
| 6,550,865 B2 | 4/2003 | Cho |
| 6,568,753 B1 | 5/2003 | Watanabe |
| 6,604,788 B1 | 8/2003 | Humer |
| 6,749,256 B1 | 6/2004 | Klier et al. |
| 6,779,840 B1 | 8/2004 | Farquhar et al. |
| 6,789,845 B2 | 9/2004 | Farquhar et al. |
| 6,789,846 B2 | 9/2004 | Humer et al. |
| 6,837,541 B2 | 1/2005 | Farquhar et al. |
| 6,938,953 B2 | 9/2005 | Haland et al. |
| 6,955,397 B1 | 10/2005 | Humer |
| 6,983,996 B2 | 1/2006 | Svantesson |
| 6,991,288 B2 | 1/2006 | Farquhar et al. |
| 7,044,544 B2 | 5/2006 | Humer et al. |
| 7,077,472 B2 | 7/2006 | Steffens, Jr. |
| 7,097,242 B2 | 8/2006 | Farquhar et al. |
| 7,325,869 B2 | 2/2008 | Braune |
| 7,455,357 B2 | 11/2008 | Humer et al. |
| 2003/0001414 A1 | 1/2003 | Humer et al. |
| 2003/0011224 A1 | 1/2003 | Humer et al. |
| 2003/0015897 A1 | 1/2003 | Humer et al. |
| 2004/0075312 A1* | 4/2004 | Neale .................... 297/216.12 |
| 2004/0119324 A1 | 6/2004 | Humer et al. |
| 2004/0155496 A1 | 8/2004 | Farquhar et al. |
| 2006/0071517 A1 | 4/2006 | Humer et al. |
| 2006/0103189 A1 | 5/2006 | Humer et al. |
| 2006/0103190 A1 | 5/2006 | Humer et al. |
| 2006/0202524 A1* | 9/2006 | Yamaguchi ............ 297/216.12 |
| 2006/0202525 A1* | 9/2006 | Yamaguchi et al. .... 297/216.12 |
| 2008/0036250 A1* | 2/2008 | Kim ...................... 297/216.12 |
| 2008/0084098 A1* | 4/2008 | Humer et al. .......... 297/216.12 |
| 2008/0129092 A1* | 6/2008 | Omori .................... 297/216.1 |

FOREIGN PATENT DOCUMENTS

| | | |
|---|---|---|
| DE | 19752247 A1 | 6/1999 |
| DE | 10249265 B3 * | 2/2004 |
| DE | 102005052746 A1 | 5/2007 |

OTHER PUBLICATIONS

Translation only of Chinese Office Action for corresponding Chinese Application No. 2008100071618, mailed Jul. 17, 2009, 8 pages.

Office Action from corresponding child U.S. Appl. No. 12/412,689, mailed Oct. 15, 2009, 13 pages.

* cited by examiner

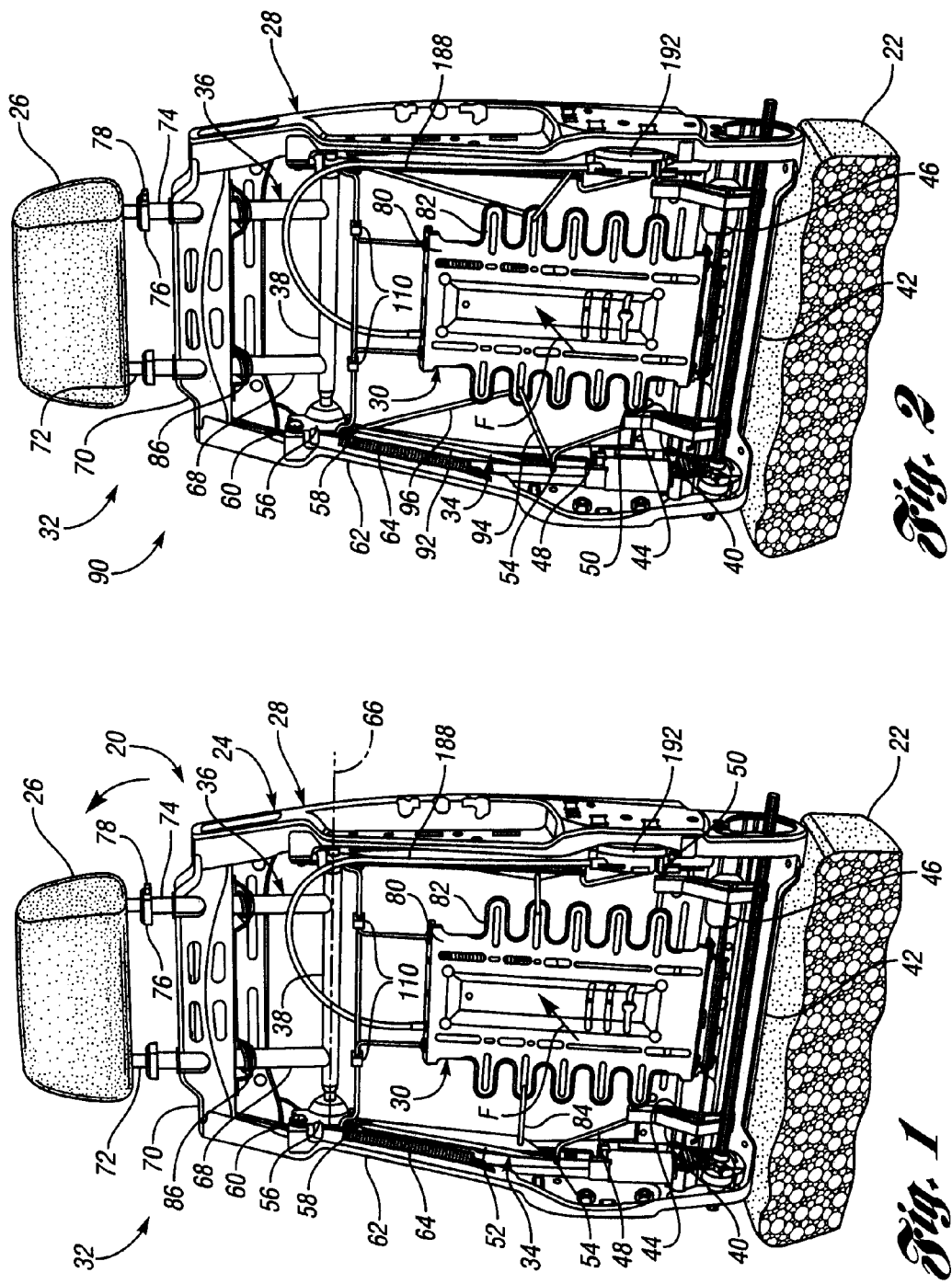

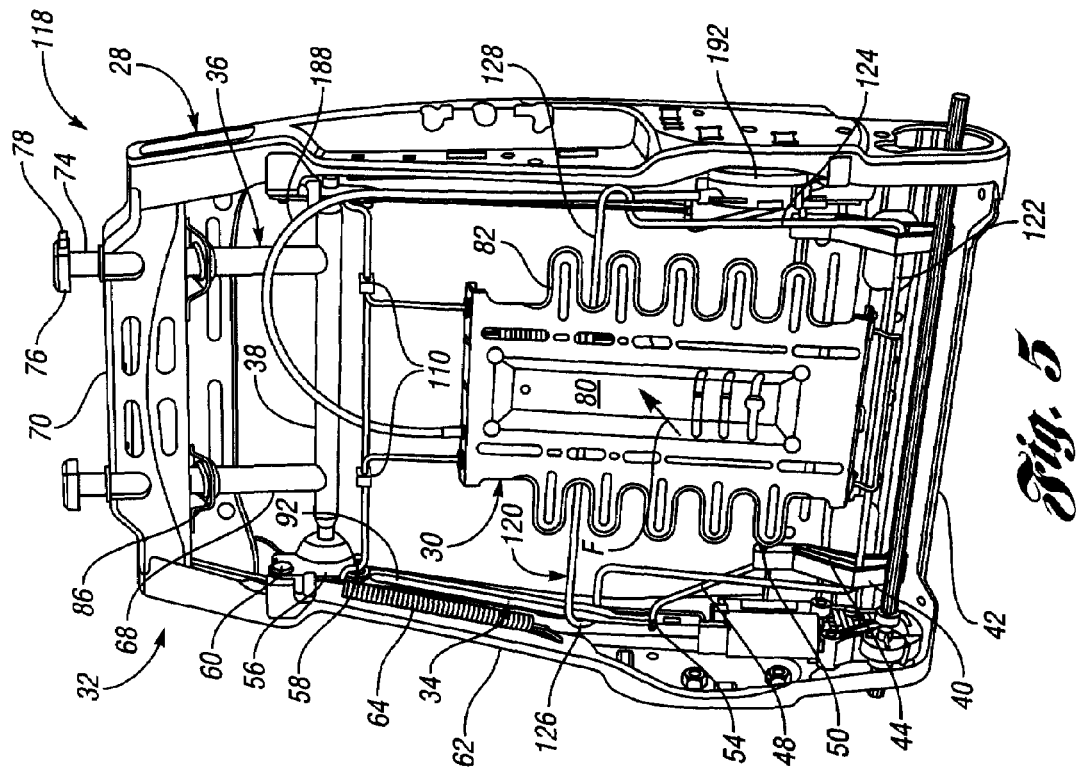
Fig. 5
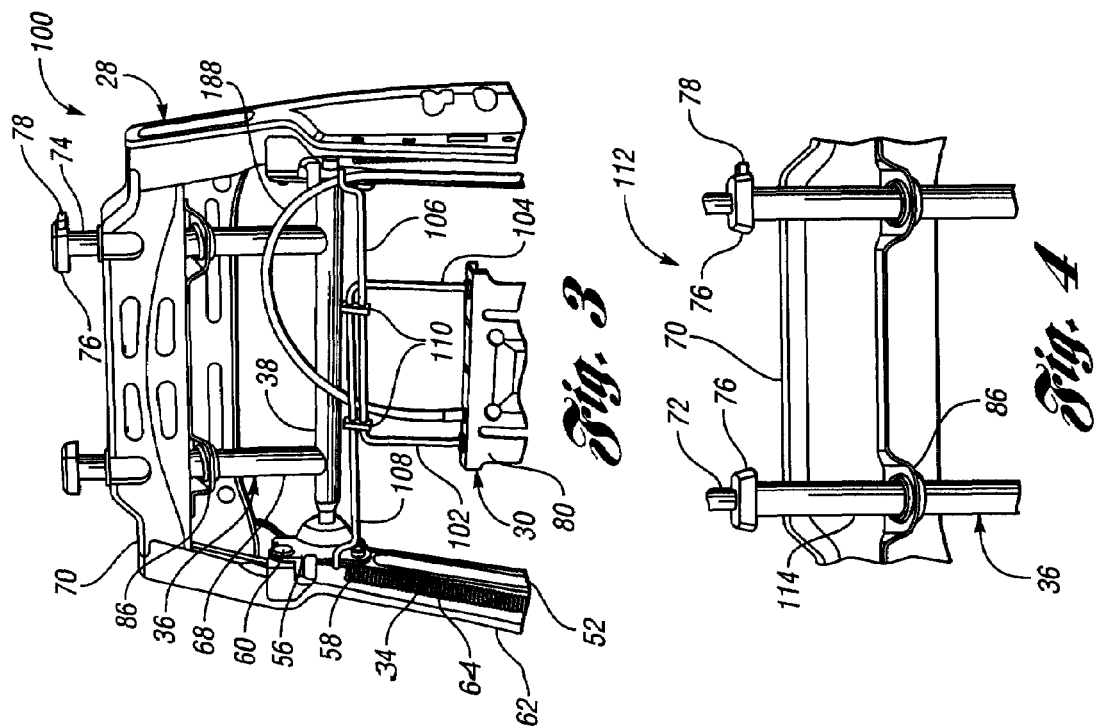
Fig. 3
Fig. 4

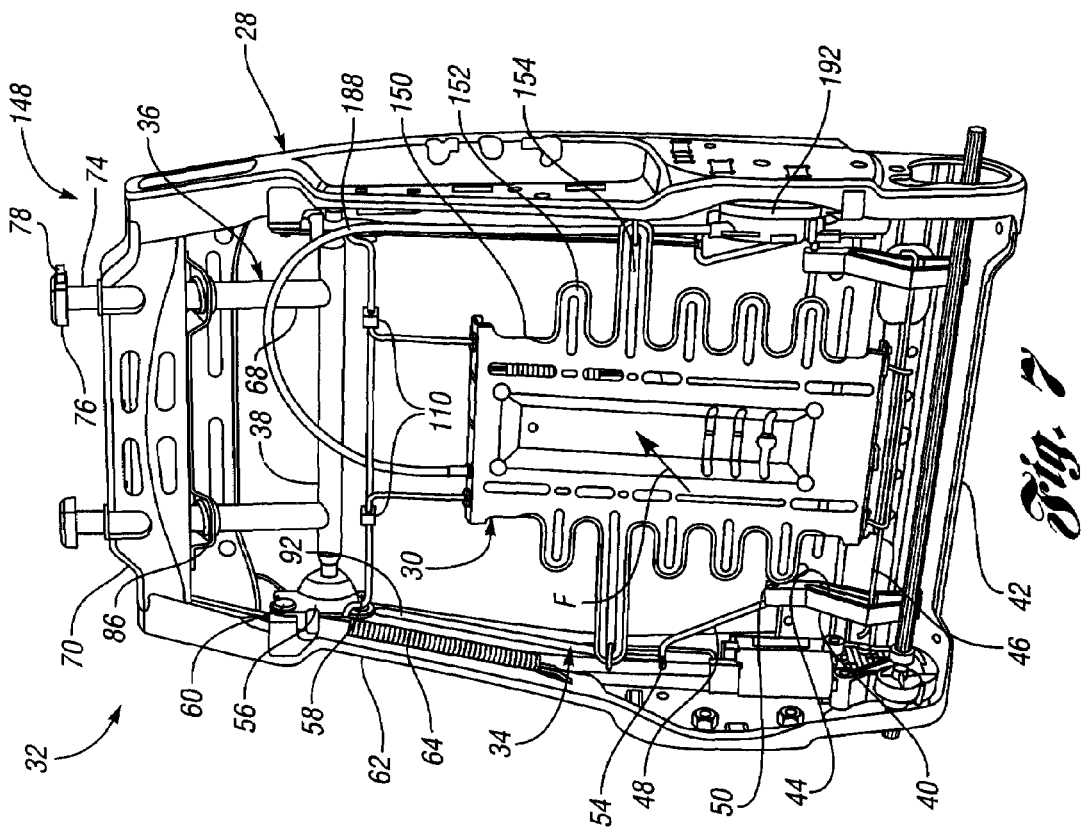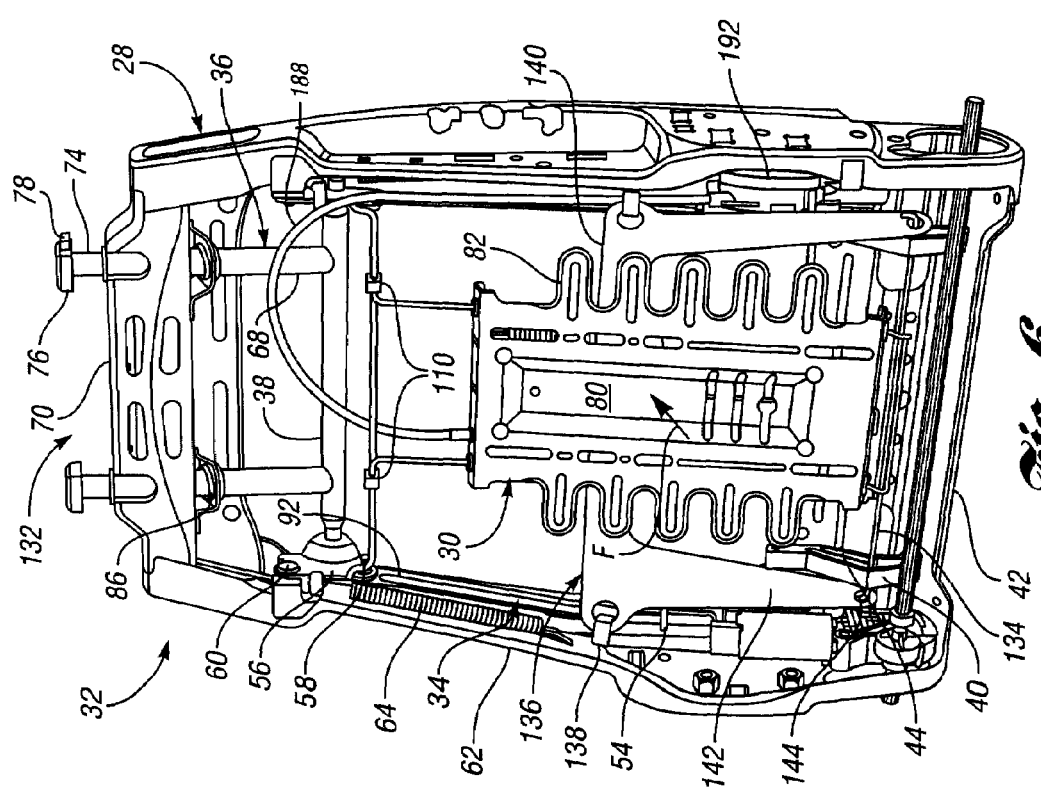

US 7,677,659 B2

ACTIVE HEAD RESTRAINT SYSTEMS FOR VEHICLE SEATS

BACKGROUND OF THE INVENTION

1. Field of the Invention

The invention relates to active head restraints for vehicle seats.

2. Background Art

Vehicle seats are provided with translatable head restraints for translating to an impact position in response to a force imparted to the seat by an occupant during an impact condition. Examples of vehicle seats having active head restraint systems are disclosed in U.S. Pat. No. 6,789,845 B2, which issued on Sep. 14, 2004, and U.S. Pat. No. 6,955,397 B1, which issued on Oct. 18, 2005.

BRIEF DESCRIPTION OF THE DRAWINGS

FIG. 1 is a perspective view of an embodiment of a vehicle seat in accordance with the present invention;

FIG. 2 is a perspective view of another embodiment of a vehicle seat in accordance with the present invention;

FIG. 3 is a perspective view of a portion of another vehicle seat embodiment in accordance with the present invention;

FIG. 4 is a front side elevation view of a top portion of another vehicle seat embodiment in accordance with the present invention;

FIG. 5 is a perspective view of another vehicle seat embodiment in accordance with the present invention;

FIG. 6 is a perspective view of yet another vehicle seat embodiment in accordance with the present invention;

FIG. 7 is a perspective view of a further vehicle seat embodiment in accordance with the present invention;

DESCRIPTION OF EMBODIMENTS OF THE INVENTION

Figure 8:
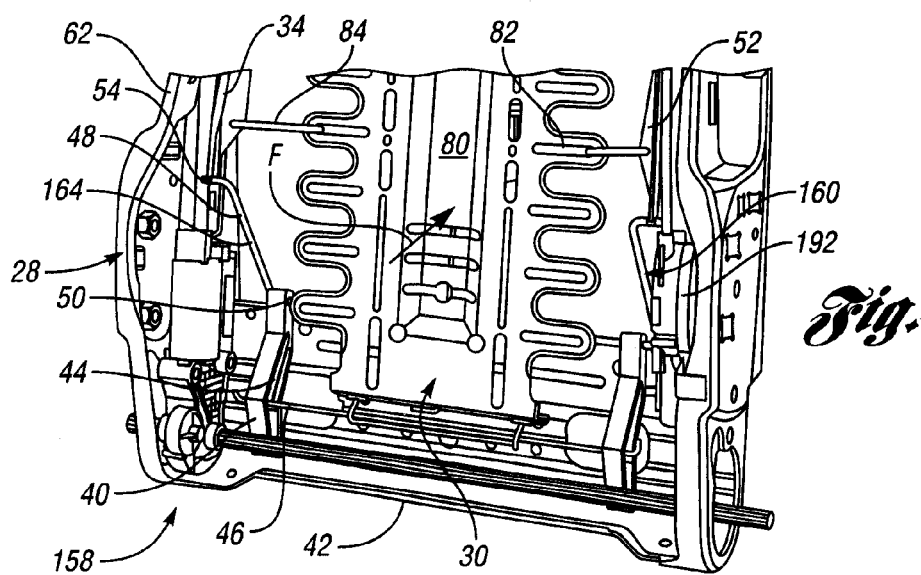
FIG. 8 is an enlarged perspective view of a lower portion of another vehicle seat embodiment in accordance with the present invention.

As required, detailed embodiments of the present invention are disclosed herein; however, it is to be understood that the disclosed embodiments are merely exemplary of the invention that may be embodied in various and alternative forms. The figures are not necessarily to scale; some figures may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

With reference now to FIG. 1, a vehicle seat is illustrated in accordance with an embodiment of the present invention and is referenced generally by numeral 20. The vehicle seat 20 includes a seat bottom 22 secured to a floor of the associated vehicle for seating an occupant upon the seat bottom 22. A seatback 24 extends from the seat bottom 22 and is secured relative to the seat bottom 22 for supporting the back of the occupant against the seat back 24. The seatback 24 is illustrated with a cover, padding and trim removed therefrom. The seat 20 also includes a head restraint 26 extending above the seatback 24 for supporting the head of the occupant against the head restraint 26.

In one embodiment, the seatback 24 includes a frame 28 for providing the structural support to the seatback 24. The seatback 24 provides torso support to an occupant by trim wires (not shown) beneath the padding (not shown) that are mounted to the frame 28. Additionally, torso support may be provided by an adjustable lumbar support 30 for supporting a lumbar region of the occupant, while providing adjustability so that the occupant can select a desired level of comfort and support. The lumbar support 30 may be an input for an active head restraint system 32. For example, the lumbar support 30 may be connected to an actuatable mechanism, such as a linkage 34. Upon receipt of an impact to the lumbar support 30, such as the body of the occupant that exceeds a predetermined force, the lumbar support 30 may actuate the linkage 34. The output of the linkage 34 may be the head restraint 26, so that the head restraint 26 is translated forward and upward relative to the seat back 24, as illustrated by an arcuate arrow in FIG. 1. In another embodiment, the back of the occupant is supported by a static suspension wire that is mounted to the linkage 34.

The output of the linkage 34 may include an armature 36 with an armature crossbar 38 that extends transversely across the frame 28. The armature 36 is connected to the linkage 34 for translation relative to the frame 28. In one embodiment, the head restraint 26 is supported by the armature 36 and actuated by the linkage 34.

The lumbar support 30 is mounted to the frame 28 by a pair of ramps 40 as is known in the art. The lumbar support 30 is also mounted to the linkage 34. The ramps 40 are mounted to a lower cross member 42 of the frame 28. The ramps 40 each include a slot 44 formed through the ramp 40 that is inclined in a rearward direction relative to the upright frame 28. FIG. 1 illustrates a front of the vehicle seat 20 and therefore a rearward direction would be towards a rear side of the seatback 24.

The lower end of the lumbar support 30 includes a transverse axle 46 extending from lateral sides of the lumbar support 30. The axle 46 extends through the slots 44 of the ramps 40 so that the lumbar support 30 can pivot relative to the ramps 40. Also, the axle 46 can translate within the slots 44 so that the lumbar support 30 can slide generally upward and rearward relative to the seatback 24.

The linkage 34 may be a four-bar mechanism, such as a four-bar link mechanism as illustrated in the embodiment of FIG. 1 or as disclosed in the embodiments of U.S. patent application Ser. No. 11/538,485, now U.S. Pat. No. 7,455,357 B2, which was filed on Oct. 4, 2006 and is incorporated in its entirety by reference herein. The linkage 34 includes a pair of lower links 48, which are each pivotally connected to the frame 28 by an aperture 50 formed through the corresponding ramp 40. The apertures 50 provide a pivotal connection to the lower links 48 at a generally rearward orientation relative to the frame 28. A pair of coupler links 52 are each pivotally connected to a lateral extension 54 of each lower link 48. The coupler links 52 are each oriented at a lateral side of the linkage 34 and extend upward within the seat frame 28. The coupler links 52 may be formed from any suitable manufacturing method, such as a cold-forming operation. Likewise, the coupler links 52 may be formed from any suitable material, such as stamped steel.

An upper end of each coupler link 52 is pivotally connected to an upper link 56 at pivotal connection 58. The pivotal connection 58 may be provided by fasteners, such as a bolt and nut. The upper links 56 are each pivotally connected at a pivotal connection 60 to an upper region of a side member 62 of the frame 28. The pivotal connection 60 of the upper links 56 may be provided by a fastener, such as a bolt, a rivet or the like. The upper links 56 may also be formed from a cold-forming operation, such as stamping steel, or any suitable manufacturing method. The links 48, 52, 58 and the frame 28 collectively provide a four-bar mechanism, such as the four-bar linkage 34 for actuation of the active head restraint mechanism 32.

For the embodiment illustrated, an extension spring 64 is connected at one end to an intermediate region of the corresponding side member 62. An upper end of the extension spring 64 is connected to the upper link 56 for urging the linkage 34 to a design position, which is illustrated in FIG. 1.

The armature crossbar 38 extends laterally across the frame 28 and is pivotally connected with both upper links 56 for pivoting about an axis 66, which is offset from the link provided linearly between the pivotal connection 58 of the upper link 56 and the coupler link 52, and the pivotal connection 60 provided by the upper link 56 and the frame side members 62. The armature crossbar 38 interconnects both lateral sides of the linkage 34 for uniform actuation.

A pair of upright tubes 68 extend from the armature crossbar 38 through an upper cross member 70 of the frame 28. The tubes 68 receive a pair of rods 72, which support the head restraint 26 above the seatback 24. The tubes 68 may include a pair of stems 74 inserted into a distal end of each tube 68. A cap 76 may be oriented upon each stem 74 external of the cover of the seatback 24. One of the caps 76 may include a locking mechanism 78 for permitting height adjustment of the head restraint 26 relative to the seatback 24. The head restraint rods 72 each cooperate with the upper cross member 70 for linear and angular translation relative to the upper cross member 70 and to pivot about the armature axis 66 relative to the upper cross member 70.

The lumbar support 30 includes a surface 80 for supporting a lumbar region of the back of the occupant. The lumbar surface 80 is provided upon a plate, mesh or any suitable material. The lumbar support 30 may be adjustable for providing variable lumbar support to the occupant. The lumbar surface 80 includes a series of lateral extensions 82 for providing lateral lumbar support to the occupant. In the embodiment illustrated in FIG. 1, a pair of input links 84 are pivotally connected to the coupler links 52 and pivotally connected to one of the extensions 82 on each lateral side of the lumbar surface 80. Thus, the lumbar support 30 is pivotally connected to the linkage 34 due to the pivotal connection through the input links 84.

During an impact condition, the seatback 24 may receive a force of the occupant against the seatback 24. The head restraint mechanism 32 actuates the head restraint 26 from the design position to an actuated position to orient the head restraint 26 higher relative to the seat back 24 and closer to the head of the occupant in order to provide support to the head to minimize potential for injury to the occupant. The input force to the head restraint mechanism 32 is distributed through the lumbar support 30 as illustrated by the arrow F in FIG. 1. The input force F may be generated, for example, when the vehicle is impacted by another object thereby accelerating the seat 20 into the occupant. Such an impact condition may be generated from an impact, such as a rear impact. Likewise, the impact condition may be generated from a forward impact wherein the occupant rebounds from a seat harness or other mechanism into the seat 20. As another example, the impact may be caused when the vehicle is traveling in reverse, which is typically a low speed. If the force F of the occupant exceeds a predetermined force to overcome the bias of the extension spring 64, then the active head restraint mechanism 32 actuates.

As the force F is transferred to the lumbar support 30, the axle 46 translates within the slot 44 upward and rearward. Likewise, the lumbar surface 80 translates upward and rearward and the impact force F is distributed to the linkage 34 through the input links 84. The input links 84 urge the coupler links 52 in a rearward direction of the seatback 24. This translation of the coupler links 52 causes the lower links 48 to pivot about the ramps 40 to translate rotationally from the design position.

As the coupler links 52 are translated rearward relative to the seatback 24, the coupler links 52 rotationally translate the upper links 56 due to the pivotal connections 58. The upper links 56 pivot about the pivotal connections 60 with the side members 62 of the frame 28. As the coupler links 52 translate rearward to the actuated position, the upper links 56 are driven to an actuated position as well.

As the upper links 56 pivot about pivotal connection 60, the armature crossbar 38 is also driven about the pivotal connection 60 such that the armature crossbar 38 is driven rearward and upward relative to the seatback 24. As the armature 36 is driven, the armature 36 pivots about the armature axis 66 such that the armature tubes 68 translate upward and forward relative to the upper cross member 70 of the frame 28. The upper cross member 70 also includes a pair of guides 86 each displaced about one of the armature tubes 68 for guiding the translation of the tube 68. The guides 86 act as fulcrums, so that as the armature 36 is driven rearward, the distal ends of the tubes 68 pivot as illustrated by the arcuate arrow. Thus, the linkage 34 drives the head restraint upward and forward in response to an impact condition.

The linkage 34 may be designed to self lock in the impact condition as disclosed in U.S. patent application Ser. No. 11/538,485, now U.S. Pat. No. 7,455,357 B2. Upon removal of an appropriate force F at the lumbar support 30, the extension spring 64 may return the linkage 34 to the design position.

The input force F may be provided to the lumbar support 30 by force of the occupant at lumbar and pelvic regions. These forces may be distributed to the input links 84 and consequently to the coupler links 52. The pivotal connection of the input links 84 with the coupler links 52 may be offset rearward from the pivotal connections of the coupler link 52 at the lateral extension 54 of the lower link 48 and the pivotal connection 58 with the upper link 56. This distribution of force directly applies the force F to the coupler link 52 for an efficient force input path. By providing the pivotal connection between the input links 84 and the coupler links 52, the input force F is efficiently utilized for translating the coupler links 52 generally rearward and upward, while minimizing lengthwise forces within the links of the linkage 34, which may otherwise be provided by a rigid connection of the lumbar support 30 to the linkage 34. The input links 84 may be provided by any suitable material, including wire, cable or fabric. The coupler links 52 may include a reinforced width as illustrated for enhancing the structural integrity of the coupler links 52 for receipt of the input force for actuating the linkage 34.

Referring now to FIG. 2, another seatback 90 embodiment for a vehicle seat 20 is illustrated. The seatback 90 is similar to the prior embodiment and similar or same elements are assigned the same reference numerals, wherein new or alternative elements are assigned new reference numerals. The seatback 90 includes a linkage 34 with a pair of linear coupler links 92. A pair of lower input links 94 are each pivotally and slidably connected to one of the extensions 82 of the lumbar support 30 and to the pivotal connection provided at the lateral extension 54 of the lower links 48. A pair of upper input links 96 are each provided pivotally and slidably connected to one of the extensions 82 of the lumbar support 30, which may be a common connection with the lower input link 94 as illustrated in FIG. 2. The other end of each of the upper input links 96 is pivotally connected to the pivotal connection 58 of the coupler link 92 and the upper link 56. The triangulated arrangement of the input links 94, 96 permits utilization of a simple linear coupler link 92 that is in compression only during the distribution of the input force F. Further, efficient distribution of the input force is applied to multiple locations on the linkage 34 such that the lower link 48 and upper link 56 are simultaneously actuated with receipt of the input force. In another embodiment, the input links 94, 96 are mounted to the extensions 82 for pivoting relative to the extensions without linear translation of the links 94, 96 relative to the extensions 82.

The input links 94, 96 may be provided by any suitable material, such as wire, cable or fabric. The input links 94, 96 may be flexible, such as a cable, so that the connection of the lumbar support 30 with the cable of the links 94, 96 can translate lengthwise along the cable thereby varying the length, orientation and triangulation of the input links 94, 96 during actuation of the linkage 34. Additionally, a large portion of the horizontal component of the input force F is translated directly to the linkage 34 for the resulting actuation of the head restraint 26.

FIG. 3 illustrates a portion of another seatback embodiment 100, which utilizes another connection of the lumbar support 30 to the linkage 34, which may provide the input for the linkage 34, or may be used in combination with the input links of the prior embodiments of FIGS. 1 and 2. The lumbar support 30 includes a pair of upright wires 102, 104, which extend from a top portion of the lumbar support 30. The upright wires 102, 104 each extend to an elevation approximate to the upper link 56. At that point, each of the upright wires 102, 104 includes a transverse portion 106, 108, which extend across the seatback 100 and into pivotal connection with the opposed upper link 56. The transverse portions 106, 108 overlap in an intermediate region of the seatback 100 and are retained together by clips 110.

The upright wires 102, 104 provide inputs from the lumbar support 30 to the linkage 34. Thus, the top region of the lumbar support 30 may travel in phase, or similarly in phase with the actuation of the coupler links 92. The cooperation of the lumbar support 30 with the upper links 56 enhances load transfer to ensure full actuation of the linkage 34 and consequently the armature 36 and the head restraint 26. Additionally, the connection of the lumbar support 30 to the upper links 56 facilitates receipt of the input force including the shoulder region of the occupant, and distribution of the input force to the linkage 34 at the upper link 56 alone, or in combination with other inputs, such as the inputs of the previous embodiments. Additionally, the elongated transverse portions 106, 108 of the upright wires 102, 104 permit deformation of the wires 102, 104 for enhanced horizontal translation of the input force thereby providing flexibility and compliancy rather than a rigid connection of the upper region of the lumbar support 30.

FIG. 4 illustrates still another seatback 112 embodiment for utilization with the vehicle seat 20. Armature tubes 114 extend through the upper cross member 70 to an elevation substantially greater than that of the prior embodiments to thereby obviate the need for the stems 74. The upright tubes 114 extend to a height generally equivalent to that of a cover for the seatback 112. The caps 76 are mounted directly to the upright tubes 114 for receipt of the head restraint rods 72. One of the caps 76 includes the locking mechanism 78 for cooperating with the head restraint rods 72 and for permitting height adjustment of the head restraint 26 relative to the seatback 112.

Another seatback 118 embodiment is illustrated in FIG. 5. The lumbar support 30 of the seatback 118 has a unitary axle and input provided by input wire 120. The input wire 120 has a lower transverse portion 122 that is pivotally connected to the lumbar surface 80 of the lumbar support 30. The lower transverse portion 122 provides the axle for the lumbar support 30 and therefore extends through the slots 44 in the ramps 40. The input wire 120 includes a pair of upright portions 124 at lateral ends of the lower transverse portion 122 that extend upward for engagement with the linkage 34. The input wire 120 includes a hoop 126 at each end of the upright portions 124 to extend about the corresponding coupler link 92. The input wire 120 also includes an upper transverse portion 128 that interconnects the hoops 126 and extends behind the lumbar support 30 for supporting the lumbar support 30 against the linkage 34.

As the seatback 118 absorbs the input force F, the force F is distributed to the lumbar support 30, which translates rearward and upward as the lower transverse portion 122 extends rearward and upward through the slots 44 and the ramps 40. The lumbar support 30 is urged against the upper transverse portion 128, which distributes this force to the coupler links 92 for actuating the linkage 34. As the lumbar support 30 moves upward relative to the coupler links 92, the hoops 126 permit the input wire 120 to translate linearly about the coupler links 92. Thus, the horizontal component of the input force is imparted directly into the linkage 34 while permitting upright translation of the lumbar support 30 relative to the coupler links 92 of the linkage 34.

Another seatback 132 embodiment is illustrated in FIG. 6. The lumbar support 30 is pivotally mounted to an axle 134 that extends through the slots 44 in the ramps 40. A fabric input member 136 extends behind the lumbar surface 80 of the lumbar support 30 for supporting the lumbar support 30 against the linkage 34. The coupler links 92 each include a hooked tab 138. Each hooked tab 138 extends through a transverse portion 140 of the fabric member 136. The tabs 138 are each mounted upon one of the coupler links 92 for supporting the transverse portion 140 and consequently the lumbar support 30 against the coupler links 92. The transverse portion 140 is depicted extending behind an intermediate region of the lumbar support 30 for receipt of the input force. The fabric member 136 also includes a pair of upright portions 142, which each extend along a lateral side of the seatback 132 are each mounted upon a hook 144 provided on a distal end of the axle 134.

Similar to the prior embodiment, an input force F to the seatback 132 translates the lumbar support 30 against the transverse portion 140 of the fabric member 136 for inputting the force to the coupler members 92 of the linkage 34. As the lumbar support 30, axle 134 and fabric member 136 translate rearward and upward, the tabs 138 slide upon the coupler links 92 for upright translation relative to the coupler links. Thus, the horizontal component of the input force F is efficiently transferred to the linkage 34 for actuation of the linkage 34 and consequently actuation of the head restraint 26 to the actuated position. By utilizing the fabric member 136 instead of a unitary wire or input, compliancy is provided to damp the resultant force imparted upon the occupant.

With reference now to FIG. 7, yet another seatback 148 embodiment is illustrated. Rather than utilizing a separate input member, the lumbar support 30 employs a lumbar surface 150 with a series of lateral extensions 152 for occupant support, and at least a pair of oversized extensions 154, which extend across the seatback 148 for hooking to the coupler links 92 of the linkage 34. During an impact condition wherein the input force translates the lumbar support 30 rearward and upward, the input extensions 154 engage the coupler links 92 and distribute the input force to the coupler links 92 thereby actuating the linkage 34 and consequently the head restraint 26. Since the lumbar support 30 is pivotally supported by the axle 46 within the slots 44 for upward and rearward translation, the input extensions 154 engage the coupler links 92 to translate along the coupler links 92 to permit the lumbar support 30 to translate in an upright direction relative to the coupler links 92 while distributing the horizontal component of the input force efficiently into the linkage 34.

Figure 9:
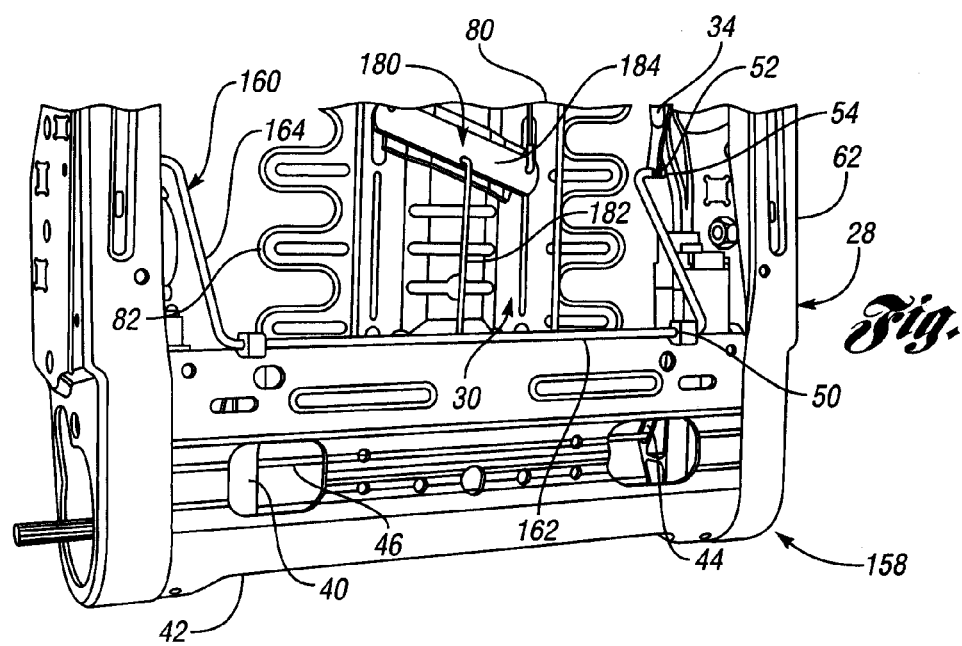
FIG. 9 is an enlarged rear perspective view of the portion of the vehicle seat of FIG. 8.

Referring to FIGS. 8 and 9, another seatback 158 embodiment is illustrated, which may be utilized with prior embodiments. The lumbar support 30 is mounted upon the axle 46, which is received in the slots 44 of the ramps 40. The ramps 40 may also be employed for mounting the lower link 48 to the lower cross member 42 of the seatback frame 28. Thus, the ramps 40 provide a modular arrangement, wherein a unitary lumbar ramp and pivotal connection for a linkage may be utilized for multiple seating applications by assembling the ramps 40 to various seatback frames. For the embodiment illustrated, the ramps 40 are secured to the lower cross member 42 by a snap-fit or interference arrangement. Additionally, by incorporating the apertures 50 for the pivotal connections for the lower links 48 into the ramps 40, separate bearings or other pivotal connections are not required by the seatback frame 28.

Figure 10:
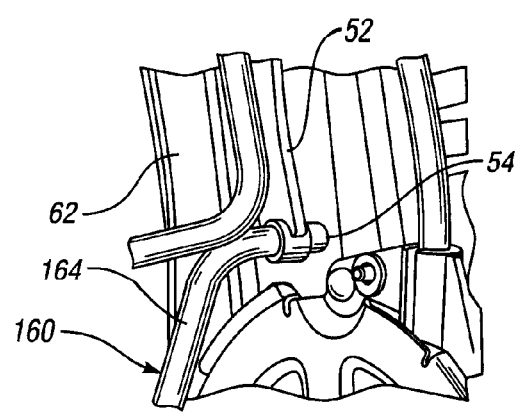
FIG. 10 is an enlarged perspective view of another portion of the vehicle seat of FIG. 8.

FIG. 9 illustrates the lower link 48 as a unitary link 160. The lower link 160 may be a cold-formed metal component, such as a metal wire or rod, stamping, a molded or cast component or any suitable manufactured component. By providing the unitary lower link 160, the lower links 48 are each oriented at one of the lateral sides of the linkage 34 within the frame 28. The lower link 160 includes a transverse portion 162 extending across the seatback 158 for interconnecting both lateral sides of the linkage 34 for uniform actuation across linkage 34. Upright members 164 extend from the transverse portions 162 and terminate in lateral extensions 54, which are pivotally connected to the coupler link 52 as illustrated with greater detail in FIG. 10.

The unitary lower link 160 interconnects both lateral sides of the linkage 34 and provides stability in the longitudinal and upright directions of the seatback 158. The unitary lower link 160 also helps counteract transverse suspension input loads in a lateral direction of the seatback 158.

During fabrication of the lower link 160, the lower link 160 may be provided as a straight metal wire, which is assembled with the ramps 40 and subsequently bent to provide the distinct transverse portion 162, upright members 164 and the lateral extensions 54. Alternatively, the lower link 160 may be pivotally connected to the lower cross member 42 instead of the ramps 40.

Figure 11:
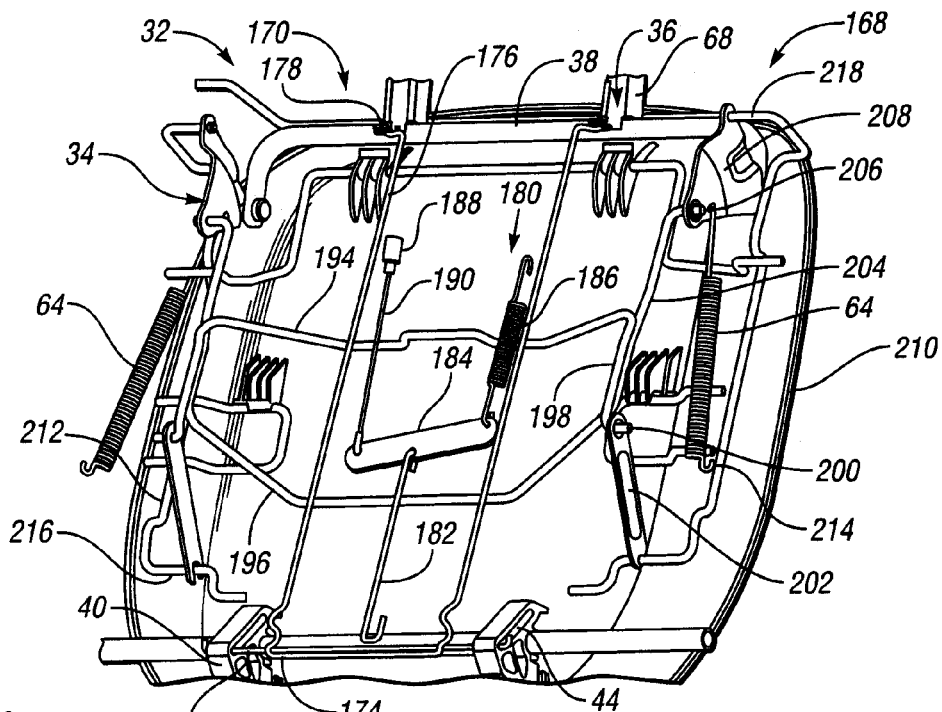
FIG. 11 is a fragmentary perspective view of yet another vehicle seat embodiment in accordance with the present invention.

Referring now to FIG. 11, another seatback 168 embodiment is illustrated. The seatback 168 is depicted without the seatback frame 28 for revealing components housed therein. The seatback 168 includes a lumbar support 170, which is illustrated with a lumbar surface 172 (FIG. 12) removed for depicting underlying components of the lumbar support 170.

The lumbar support 170 includes a wire frame 174 that is pivotally connected to the axle 46, which extends through the slots 44 and the ramps 40. The wire frame 174 includes a pair of upright wires 176, which extend along the seatback 168 and extend through brackets 178 on the armature 36. The brackets 178 may be formed integrally with the armature tubes 68 to reduce components and obviate the requirement of a separate bracket mounted to the armature 36. The cooperation of the upright wires 176 and the brackets 178 distribute some of the input force from the lumbar support 170 directly to the armature 36 for facilitating actuation of the armature 36 and the linkage 34.

FIG. 11 also illustrates a lumbar adjustment mechanism 180 of the lumbar support 170. The lumbar adjustment mechanism 180 includes a lower link 182 mounted to a lower portion of the lumbar surface 172. A lever 184 has a fulcrum pivotally connected to the lower link 182. An extension spring 186 is mounted to one end of the lever 184 and to a top portion of the lumbar surface 172. A cable sheath 188 is also mounted to a top portion of the lumbar surface 172 with a cable 190 extending through the sheath 188 and connected to the other end of the lever 184. Referring again to a previous embodiment, such as the seatback 24 of FIG. 1, the cable sheath 188 extends to an actuator 192, which may be motor driven or manual driven for actuating the cable 190 within the sheath 188. By actuating the cable 190, the lever 184 pivots relative to the lower link 182 thereby adjusting the tension of the extension spring 186 and extending the lumbar surface 172 forward or reward relative to the seatback 168 for adjusting the lumbar support.

The lumbar support 170 includes a pair of crosswires 194, 196 for providing the input from the lumbar support 170 into the linkage 34. The upper crosswire 194 extends across an intermediate region of the lumbar support 170. At lateral regions of the upper crosswire 194, a pair of upright portions 198 extend downward within the seatback 168 and terminate into lateral extensions 200 that are each pivotally connected with one of a pair of lower links 202 of the linkage 34. The lower links 202 can be formed from wires as well. The lower crosswire 196 extends transversely behind the lumbar support 170 at an intermediate region that is below that of the upper crosswire 194. The lower crosswire 196 also includes a pair of upright portions 204 that extend upward at lateral sides of the lumbar support 170. The upright portions 204 terminate into lateral extensions 206, which are each pivotally connected with one of a pair of upper links 208 of the linkage 34. Thus, coupler links of prior embodiments are replaced by the crosswires 194, 196 of the lumbar support 170 such that the lumbar support 170 distributes the input force directly into the linkage 34. The upright portions 198, 204 of the upper and lower crosswires 194, 196 extend over one another and can be fastened to one another in this region, by welding or the like. Alternatively, the upper and lower crosswires may be free to translate relative to one another to provide compliancy within the linkage 34.

The lumbar support 170 receives an input force from the occupant during an impact condition, which actuates the wire frame 174 to translate upward and rearward due to the axle 46 and ramps 40. The upright wires 176 receive some of the input force at the lumbar and shoulder regions and translate it directly to the armature 36. Additionally, the input force is distributed to the crosswires 194, 196 and subsequently to the lower links 202 and upper links 208 for overcoming the bias of extension spring 64 and thereby actuating the armature 36 for translating the head restraint 26 to the actuated position.

The seatback 168 includes a seat frame that is not illustrated. A back panel 210 is mounted to a rear region of the seatback frame to close out the rear of the seatback 168.

The frame 28 (FIG. 1) of the seatback 168 includes a pair of side members 62 (FIG. 1) similar to prior embodiments. The side members 62 (FIG. 1) include a pair of upright trim wires 212, 214. The trim wires 212, 214 are mounted within the side members 62 (FIG. 1) of the frame 28 (FIG. 1) of the seatback 168 for withstanding tensile loads of the seatback 168. To reduce the number of components provided within the seatback 168, the trim wires 212, 214 are also employed for providing pivotal connections between the linkage 34 and the seatback 168.

Figure 12:
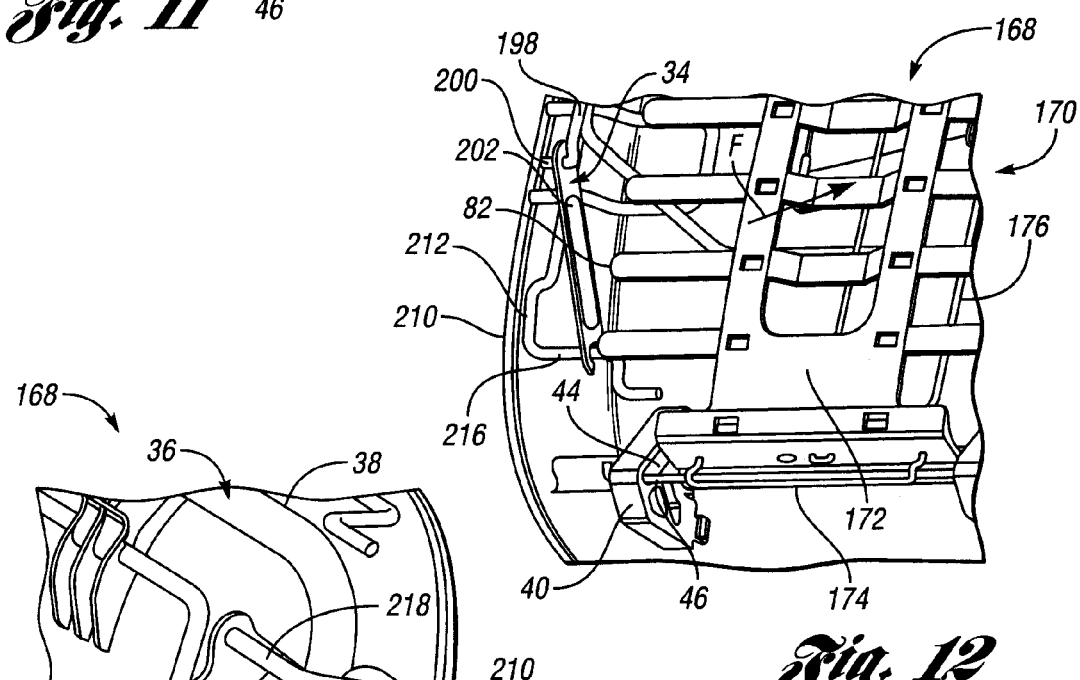
FIG. 12 is another perspective view of the vehicle seat of FIG. 11.
Figure 13:
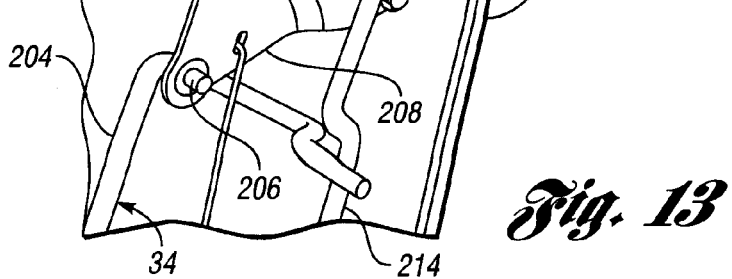
FIG. 13 is an enlarged fragmentary perspective view of a portion of the vehicle seat of FIG. 11.

Referring now to FIG. 12, the trim wire 212 is illustrated with a lower inboard lateral extension 216, which provides a pivotal connection with the lower link 202. With reference to FIG. 13, the trim wire 214 includes an upper lateral inboard extension 218, which provides a pivotal connection for the upper link 208. Thus, the number of parts may be reduced by utilizing the trim wires 212, 214 of the frame of the seatback 168 for providing pivotal connection for the lower and upper links 202, 208 of the linkage 34. Additionally, tensile forces that are applied to the seatback 168 by the linkage 34 are imparted directly to the trim wires 212, 214 as the trim wires 212, 214 provide a fixed link within the linkage 34. Additionally, the linkage 34 may be assembled without the utilization of fastening tools or the like due to the simplified employment of trim wires 212, 214 as pivotal connections. By reducing the number of components, the costs and total mass of the seatback 168 can be thereby reduced.

Figure 14:
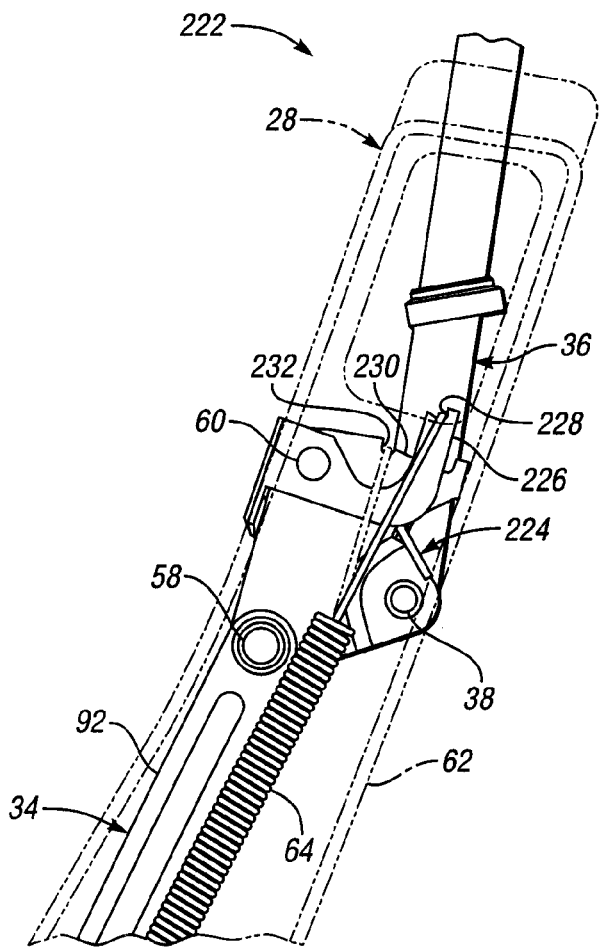
FIG. 14 is an enlarged side elevation view of an upper portion of yet another vehicle seat embodiment in accordance with the present invention, illustrated during assembly of the vehicle seat.

FIG. 14 illustrates a top portion of another vehicle seatback 222 embodiment in accordance with the present invention. The seatback 222 embodiment is similar to prior embodiments and can be utilized alone or in combination with the prior embodiments. The seatback 222 includes a seatback frame 28 with an armature 36 for supporting a head restraint 26. A linkage 34 is also mounted to the frame 28 for actuating the armature and consequently the head restraint 26. As illustrated in FIG. 14, the armature 36 includes an armature crossbar 38 pivotally connected to a pair of upper links 224. The upper links 224 are each pivotally connected one of the side members 62 of the frame 28 at a pivotal connection 60. Also illustrated is a coupler link 92 pivotally connected to each upper link 224 at pivotal connection 58.

The seatback 222 includes a bracket 226 mounted to each side member 62. The bracket 226 includes a notch 228 for receiving one end of the corresponding extension spring 64. The bracket notch 228 supports the end of the extension spring 64 prior to assembly of the spring to the linkage 34. Accordingly, the bracket 226 permits the spring 64 to be retained in the seatback 222 during assembly of the linkage 34 with the spring 64 disconnected from the linkage 34. Thus, the linkage 34 can be assembled prior to application of a pre-load of the linkage 34 by the springs 64. Once the linkage 34 is assembled, the springs 64 can be connected to the linkage 34 to pre-load the linkage 34, thereby maintaining the linkage 34 in the design position until the bias of the springs 64 is overcome by an input force.

In the depicted embodiment, the springs 64 are assembled to the linkage 34 by actuation of the linkage 34. This feature simplifies assembly of the seatback 222 by minimizing difficulties associated with assembling spring-loaded mechanisms. The linkage 34 may be actuated by a power assisted actuator during manufacturing and assembly.

Figure 15:
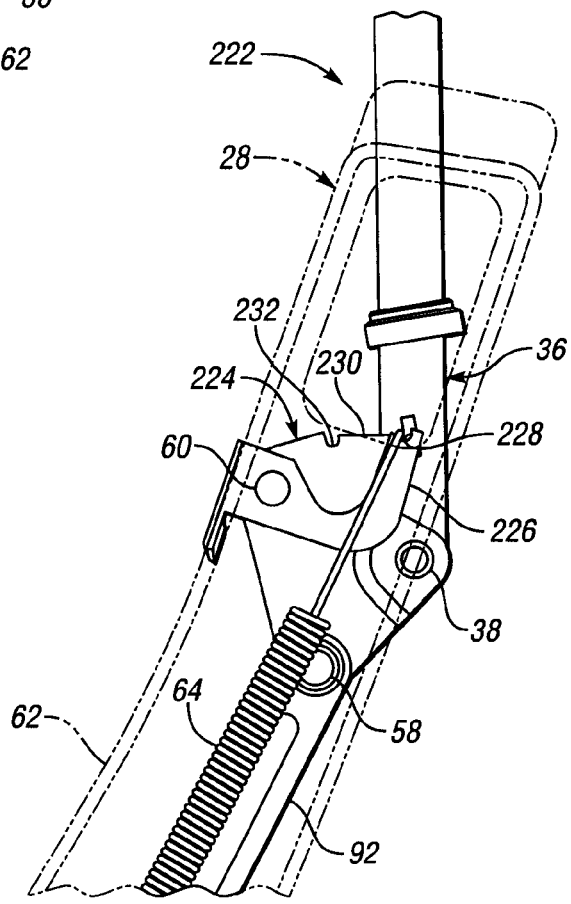
FIG. 15 is another enlarged side elevation view of the upper seat portion of FIG. 14, illustrated in another position during assembly of the vehicle seat.

As the linkage is partially actuated, the coupler links 92 translate rearward thereby causing the upper links 224 to pivot about the pivotal connections 60 to the position illustrated in FIG. 15. The upper links 224 each include a guide 230 formed along an edge, that engages the upper end of the spring 64 as the upper link 224 pivots. The guide 230 extends the extension spring 64 thereby disconnecting the extension spring 64 from the notch 228 in the bracket 226. Once the spring 64 is disconnected from the bracket 226, the spring 64 retracts, and consequently, the upper end of the spring 64 translates along the guide 230 until dropping into a notch 232 formed in the upper link 224.

Once the upper end of each spring 64 drops into the notch 232 of the respective upper link 224, the linkage 34 is assembled. At this point, the linkage 34 may return to the design position by release of the power-assisted actuation. Upon release, the springs 64 urge the upper links 224 to return to the position in FIG. 14, thereby returning the linkage 34 to the design position with the springs 64 assembled to the upper links 224 of the linkage, as illustrated in phantom in FIG. 14.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat comprising:
   a seatback frame for supporting a back of an occupant, the seatback frame having a lower cross member extending transversely across the seatback, a pair of transversely spaced upright side members extending from the lower cross member, and an upper cross member extending transversely between the side members;
   a head restraint extending from the seatback frame upper cross member for supporting a head of the occupant;
   a linkage operably connected to the seatback frame lower cross member, the seatback frame side members, and the head restraint for actuating the head restraint to an actuated position;
   a torso support having a translatable connection with the seatback frame, and another translatable connection with the linkage for supporting a torso of the occupant, for receiving an input force from the occupant during an impact condition, and for distributing the input force to the linkage for actuating the linkage and consequently actuating the head restraint;
   a pair of transversely spaced ramps mounted to the lower cross member, each ramp having a slot inclined in a rearward direction relative to the seatback frame and an aperture spaced apart from the slot; and
   an axle extending laterally from the torso support into the pair of ramps slots so that the torso support translates rearward and upward relative to the seatback frame;
   wherein the linkage further comprises:
      a first link pivotally connected to the lower cross member,
      a second link pivotally connected to the first link, and
      a third link pivotally connected to the second link and one of the side members;

wherein the translatable connection of the torso support with the linkage further comprises a fourth link pivotally connected to the torso support and pivotally connected to the second link;

wherein the first link further comprises a transverse portion extending through the ramp apertures for pivoting relative to the ramp, and a pair of upright members extending from the transverse portion;

wherein the second link further comprises a pair of second links each pivotally connected to a distal end of one of the first link upright members;

wherein the third link further comprises a pair of third links each pivotally connected to one of the second links and one of the side members; and wherein the vehicle seat further comprises an armature pivotally connected to the pair of third links and connected to the upper cross member for pivotal and linear translation relative to the upper cross member so that the links drive the armature at the pivotal connection with the third link so that the head restraint pivots forward relative to the seatback frame and translates upward relative to the seatback frame in the actuated position.

2. The vehicle seat of claim 1 wherein the head restraint further comprises an armature pivotally connected to the third link and connected to the upper cross member for pivotal and linear translation relative to the upper cross member so that the linkage drives the armature at the pivotal connection with the third link so that the head restraint pivots forward relative to the seatback frame and translates upward relative to the seatback frame in the actuated position.

3. The vehicle seat of claim 2 further comprising:
a pair of upright tubes each having a distal end extending from the armature to a top surface of the seatback;
a first cap mounted directly to the distal end of one of the upright tubes;
a second cap mounted directly to the distal end of the other of the upright tubes, the second cap having a locking mechanism within the cap; and
a pair of rods each extending from the head restraint, through one of the first and second caps and into one of the pair of upright tubes, for extending the head restraint from the seatback and for height adjustment relative to the second cap.

4. The vehicle seat of claim 1 wherein the translatable connection of the torso support with the linkage is arranged so that the second link is in compression as the linkage is actuated.

5. The vehicle seat of claim 1 wherein the fourth link is pivotally connected to the linkage at the pivotal connection of the first link and the second link, and pivotally connected to the torso support;
wherein the vehicle seat further comprises a fifth link pivotally connected to the linkage at the pivotal connection of the second link and the third link, and pivotally connected to the torso support; and
wherein the fourth and fifth links distribute the input force to the linkage so that the second link is in compression as the linkage is actuated.

6. The vehicle seat of claim 1 wherein the torso support is pivotally connected to the third link.

7. The vehicle seat of claim 1 further comprising an upright wire extending from the torso support and pivotally connected with the third link.

8. The vehicle seat of claim 1 wherein the pivotal connection of the fourth link with the second link is offset rearward from the second link pivotal connections with the first and third links, and the second link has a reinforced width at the pivotal connection with the fourth link.

9. The vehicle seat of claim 1 further comprising:
an extension spring mounted to the frame at one end and the linkage at another end for maintaining the linkage in a first position such that the input force must exceed a predetermined force to overcome the spring and actuate the linkage; and
a bracket mounted to the frame to receive the linkage end of the spring during assembly, such that an initial actuation of the linkage disconnects the linkage end of the spring from the bracket and secures the linkage end of the spring to the linkage.

10. A vehicle seat comprising:
a seatback frame for supporting a back of an occupant, the seatback frame having a lower cross member extending transversely across the seatback, a pair of transversely spaced upright side members extending from the lower cross member, and an upper cross member extending transversely between the side members;
a head restraint extending from the seatback frame upper cross member for supporting a head of the occupant;
a linkage operably connected to the seatback frame lower cross member, the seatback frame side members, and the head restraint for actuating the head restraint to an actuated position, the linkage comprising:
a first link pivotally connected to the lower cross member,
a second link pivotally connected to the first link, and
a third link pivotally connected to the second link and one of the side members;
a torso support having a translatable connection with the seatback frame, and another translatable connection with the linkage for supporting a torso of the occupant, for receiving an input force from the occupant during an impact condition, and for distributing the input force to the linkage for actuating the linkage and consequently actuating the head restraint; and
an upright wire extending from the torso support with a transverse portion extending across the seatback and pivotally connected with the third link.

11. The vehicle seat of claim 10 wherein the first link further comprises a pair of transversely spaced first links each pivotally connected to the lower cross member;
wherein the second link further comprises a pair of second links each pivotally connected to one of the first links;
wherein the third link further comprises a pair of third links each pivotally connected to one of the second links and one of the side members; and
wherein the vehicle seat further comprises:
an armature pivotally connected to the pair of third links and connected to the upper cross member for pivotal and linear translation relative to the upper cross member so that the links drive the armature at the pivotal connection with the third link so that the head restraint pivots forward relative to the seatback frame and translates upward relative to the seatback frame in the actuated position,
an axle extending laterally from the torso support into a pair of slots within the lower cross member, the slots being inclined in a rearward direction relative to the seatback frame so that upon receipt of the input force, the axle of the torso support translates rearward and upward relative to the seatback frame, and
a fabric member having a transverse portion extending behind an intermediate region of the torso support with a sliding connection with one of the pair of second links and another sliding connection with the other of the pair of second links for distributing the input force to the second links and for translating linearly relative to the second links as the linkage is actuated, the fabric member having a pair of upright portions each extending from a lateral end of the transverse portion to a pivotal connection with a lateral end of the axle.

12. The vehicle seat of claim 10 wherein the torso support engages the second link to actuate the second link and to translate linearly upward relative to the second link as the linkage is actuated.

13. The vehicle seat of claim 10 further comprising:
a pair of transversely spaced ramps mounted to the lower cross member, each ramp having a slot inclined in a rearward direction relative to the seatback frame and an aperture spaced apart from the slot; and
an axle extending laterally from the torso support into the pair of ramps slots so that the torso support translates rearward and upward relative to the seatback frame, wherein the axle is formed from a wire that extends to an intermediate region of the torso support for supporting the torso support, and the wire includes a hoop displaced about the second link to distribute the input force to the second link and to translate linearly relative to the second link as the linkage is actuated.

14. The vehicle seat of claim 10 wherein the torso support further comprises a series of lateral extensions for supporting the torso of the occupant, wherein one of the extensions spans laterally outboard to contact the second link for distributing the input force to the linkage.

15. The vehicle seat of claim 10 wherein the head restraint further comprises an armature pivotally connected to the third link and connected to the upper cross member for pivotal and linear translation relative to the upper cross member so that the linkage drives the armature at the pivotal connection with the third link so that the head restraint pivots forward relative to the seatback frame and translates upward relative to the seatback frame in the actuated position.

16. The vehicle seat of claim 10 wherein the translatable connection of the torso support with the seatback frame further comprises an axle extending from the torso support into a slot within the lower cross member, the slot being inclined in a rearward direction relative to the seatback frame so that upon receipt of the input force, the axle of the torso support translates rearward and upward relative to the seatback frame.

17. The vehicle seat of claim 10 wherein the third link further comprises a pair of spaced apart third links each pivotally connected to the second link and one of the side members; and
wherein the upright wire further comprises a pair of upright wires extending from the torso support, each with a transverse portion extending across the seatback and overlapping the other transverse portion, and each transverse portion being pivotally connected with one of the pair of third links.

18. The vehicle seat of claim 17 further comprising a clip retaining the overlapping transverse portions of the upright wires together.

19. A vehicle seat comprising:
a seatback frame for supporting a back of an occupant, the seatback frame having a lower cross member extending transversely across the seatback, a pair of transversely spaced upright side members extending from the lower cross member, and an upper cross member extending transversely between the side members;
a head restraint extending from the seatback frame upper cross member for supporting a head of the occupant;
a linkage operably connected to the seatback frame lower cross member, the seatback frame side members, and the head restraint for actuating the head restraint to an actuated position, wherein the linkage further comprises:
a first link pivotally connected to the lower cross member,
a second link pivotally connected to the first link, and
a third link pivotally connected to the second link and one of the side members;
a torso support having a translatable connection with the seatback frame for translating relative to the seatback frame, and another translatable connection with the linkage for supporting a torso of the occupant and for translating relative to the linkage, for receiving an input force from the occupant during an impact condition, and for distributing the input force to the linkage for actuating the linkage and consequently actuating the head restraint;
a pair of transversely spaced ramps mounted to the lower cross member, each ramp having a slot inclined in a rearward direction relative to the seatback frame and an aperture spaced apart from the slot; and
an axle extending laterally from the torso support into the pair of ramps slots so that the torso support translates rearward and upward relative to the seatback frame;
wherein the first link further comprises a transverse portion extending through the ramp apertures for pivoting relative to the ramp, and a pair of upright members extending from the transverse portion.

20. The vehicle seat of claim 19 wherein the second link further comprises a pair of second links each pivotally connected to a distal end of one of the first link upright members.

* * * * *